(12) United States Patent
Ahn et al.

(10) Patent No.: US 8,351,974 B2
(45) Date of Patent: Jan. 8, 2013

(54) METHOD OF CONTROLLING TRANSMIT POWER OF UPLINK CHANNEL

(75) Inventors: Seung Jin Ahn, Anyang-si (KR); Byeong Geol Cheon, Anyang-si (KR); Byong Yol Lee, Anyang-si (KR); Mu Ryong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 509 days.

(21) Appl. No.: 12/320,528

(22) Filed: Jan. 28, 2009

(65) Prior Publication Data

US 2009/0197630 A1 Aug. 6, 2009

Related U.S. Application Data

(60) Provisional application No. 61/025,817, filed on Feb. 4, 2008.

(30) Foreign Application Priority Data

May 27, 2008 (KR) .......................... 10-2008-0049147

(51) Int. Cl.
*H04B 7/00* (2006.01)
(52) U.S. Cl. .......................... 455/522; 370/319; 370/320
(58) Field of Classification Search .................... 455/522
See application file for complete search history.

(56) References Cited

U.S. PATENT DOCUMENTS

| | | | |
|---|---|---|---|
| 6,466,563 B1 * | 10/2002 | Yamada | 370/342 |
| 6,904,290 B1 * | 6/2005 | Palenius | 455/522 |
| 7,010,317 B2 * | 3/2006 | Hwang et al. | 455/522 |
| 7,065,377 B2 * | 6/2006 | Kwon et al. | 455/522 |
| 7,073,079 B1 * | 7/2006 | Karsi et al. | 713/320 |
| 7,106,700 B2 * | 9/2006 | Freiberg et al. | 370/252 |
| 7,106,791 B2 * | 9/2006 | Chen et al. | 375/224 |
| 7,206,296 B2 * | 4/2007 | Miyoshi et al. | 370/328 |
| 7,292,874 B2 * | 11/2007 | Cave et al. | 455/522 |
| 7,436,806 B2 * | 10/2008 | Hwang et al. | 370/335 |
| 7,440,769 B2 * | 10/2008 | Kondo | 455/522 |
| 7,477,658 B2 * | 1/2009 | Gu | 370/468 |
| 7,483,499 B2 * | 1/2009 | Schrodinger | 375/345 |
| 7,616,603 B2 * | 11/2009 | Anderson et al. | 370/329 |
| 7,619,998 B2 * | 11/2009 | Takeda et al. | 370/312 |
| 7,643,546 B2 * | 1/2010 | Chen et al. | 375/224 |
| 7,668,563 B2 * | 2/2010 | Heo et al. | 455/522 |

(Continued)

FOREIGN PATENT DOCUMENTS

CN 1852037 A 10/2006

(Continued)

OTHER PUBLICATIONS

Qualcomm Europe, "PDCCH Format for Transmission of TPC Commands", 3GPP TSG-RAN WG1 #50, Aug. 20-24, 2007, R1-073257, 2 pages.*

(Continued)

*Primary Examiner* — Hai Nguyen
(74) *Attorney, Agent, or Firm* — McKenna Long & Aldridge LLP

(57) ABSTRACT

A method of controlling a transmit power of an uplink channel is provided. Downlink control information of which Cyclic Redundancy Check (CRC) parity bits are masked with a TPC identifier is received on a downlink control channel. The transmit power of the uplink channel is adjusted based on a TPC command in the downlink control information.

10 Claims, 18 Drawing Sheets

U.S. PATENT DOCUMENTS

| | | | |
|---|---|---|---|
| 7,701,901 B2* | 4/2010 | Anderson et al. | 370/329 |
| 7,715,866 B2* | 5/2010 | Seppinen et al. | 455/522 |
| 7,792,085 B2* | 9/2010 | Hwang et al. | 370/335 |
| 7,881,740 B2* | 2/2011 | Furukawa et al. | 455/522 |
| 7,885,677 B2* | 2/2011 | Furukawa et al. | 455/522 |
| 7,894,844 B2* | 2/2011 | Hiddink et al. | 455/522 |
| 7,933,624 B2* | 4/2011 | Furukawa et al. | 455/522 |
| 7,945,280 B2* | 5/2011 | Furukawa et al. | 455/522 |
| 7,949,315 B2* | 5/2011 | Rofougaran | 455/127.1 |
| 8,009,606 B2* | 8/2011 | Seo et al. | 370/319 |
| 8,073,396 B2* | 12/2011 | Furukawa et al. | 455/70 |
| 8,073,480 B2* | 12/2011 | Furukawa et al. | 455/522 |
| 8,095,171 B2* | 1/2012 | Furukawa et al. | 455/522 |
| 8,107,987 B2* | 1/2012 | Malladi et al. | 455/522 |
| 8,135,341 B2* | 3/2012 | Furukawa et al. | 455/39 |
| 8,149,778 B2* | 4/2012 | Anderson et al. | 370/329 |
| 8,270,359 B2* | 9/2012 | Nangia et al. | 370/329 |
| 8,280,430 B2* | 10/2012 | Naguib et al. | 455/550.1 |
| 2004/0248609 A1* | 12/2004 | Tamura | 455/522 |
| 2004/0266469 A1* | 12/2004 | Hayashi et al. | 455/522 |
| 2005/0143120 A1 | 6/2005 | Cave et al. | |
| 2006/0252451 A1* | 11/2006 | Cho et al. | 455/522 |
| 2008/0200203 A1* | 8/2008 | Malladi et al. | 455/522 |
| 2008/0207150 A1* | 8/2008 | Malladi et al. | 455/127.1 |
| 2008/0280638 A1* | 11/2008 | Malladi et al. | 455/522 |
| 2009/0034465 A1* | 2/2009 | Papasakellariou et al. | 370/329 |
| 2009/0088148 A1* | 4/2009 | Chung et al. | 455/423 |
| 2009/0149210 A1* | 6/2009 | Hosokawa | 455/522 |
| 2009/0197630 A1* | 8/2009 | Ahn et al. | 455/522 |
| 2010/0034303 A1* | 2/2010 | Damnjanovic et al. | 375/260 |
| 2010/0118807 A1* | 5/2010 | Seo et al. | 370/329 |
| 2010/0202389 A1* | 8/2010 | Cai et al. | 370/329 |
| 2010/0232373 A1* | 9/2010 | Nory et al. | 370/329 |
| 2010/0238892 A1* | 9/2010 | Dahlman et al. | 370/329 |
| 2010/0254329 A1* | 10/2010 | Pan et al. | 370/329 |
| 2011/0019776 A1* | 1/2011 | Zhang et al. | 375/340 |
| 2011/0038271 A1* | 2/2011 | Shin et al. | 370/252 |
| 2011/0096815 A1* | 4/2011 | Shin et al. | 375/219 |
| 2011/0164584 A1* | 7/2011 | Seo et al. | 370/329 |
| 2011/0222485 A1* | 9/2011 | Nangia et al. | 370/329 |
| 2011/0274031 A1* | 11/2011 | Gaal et al. | 370/315 |
| 2011/0306383 A1* | 12/2011 | Lee et al. | 455/522 |
| 2011/0310811 A1* | 12/2011 | Yamada | 370/329 |
| 2012/0044882 A1* | 2/2012 | Kim et al. | 370/329 |
| 2012/0113946 A1* | 5/2012 | Seo et al. | 370/329 |
| 2012/0140726 A1* | 6/2012 | Moon et al. | 370/329 |
| 2012/0170510 A1* | 7/2012 | Kim et al. | 370/315 |
| 2012/0188974 A1* | 7/2012 | Qiang et al. | 370/329 |
| 2012/0202554 A1* | 8/2012 | Seo et al. | 455/522 |
| 2012/0208583 A1* | 8/2012 | Chung et al. | 455/509 |
| 2012/0213189 A1* | 8/2012 | Choi et al. | 370/329 |
| 2012/0224535 A1* | 9/2012 | Kim et al. | 370/328 |
| 2012/0224553 A1* | 9/2012 | Kim et al. | 370/329 |
| 2012/0257519 A1* | 10/2012 | Frank et al. | 370/252 |

FOREIGN PATENT DOCUMENTS

| | | |
|---|---|---|
| JP | 2003-188816 | 7/2003 |
| JP | 2005-051807 A | 2/2005 |
| WO | WO 2007/145495 A1 | 12/2007 |

OTHER PUBLICATIONS

Qualcomm Europe, "PDCCH Formats and Contents", 3GPP TSG-RAN WG1 #51bis, R1-080469, Jan. 2008.

Qualcomm Europe, "PDCCH Format for Transmission of TPC Commands", 3GPP TSG-RAN WG1 #50, R1-073257, Aug. 2007.

"3rd Generation Partnership Project; Technical Specification Group Radio Access Network Evolved Universal Terrestrial Radio Access (E-UTRA); Multiplexing and Channel Coding (Release 8)" 3rd Generation Partnership Project (3GPP); Technical Specification (TS), No. 3GPP TS 36.212 V8.0.0, Sep. 2007, XP002539820.

* cited by examiner

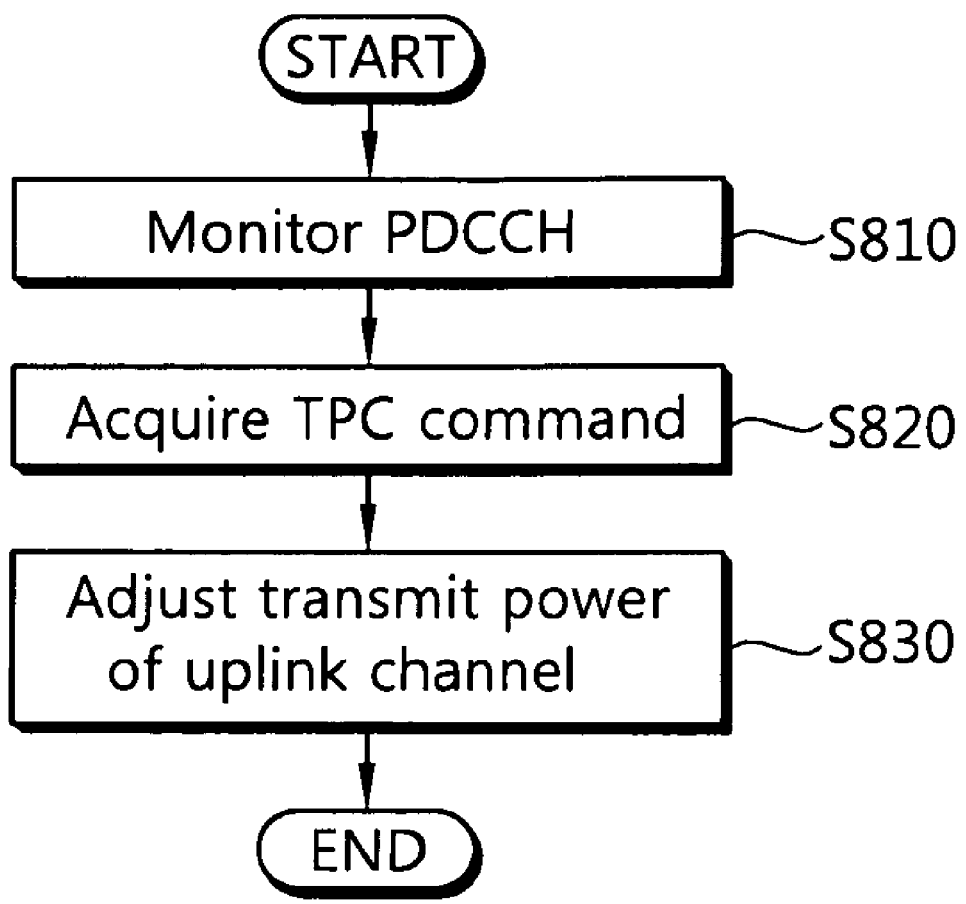

METHOD OF CONTROLLING TRANSMIT POWER OF UPLINK CHANNEL

CROSS-REFERENCE TO RELATED APPLICATIONS

This application claims the benefit of priority of U.S. Provisional Application Ser. No. 61/025,817, filed on Feb. 4, 2008, and Korean Patent Application No. 10-2008-0049147 filed on May 27, 2008, each of which is incorporated by reference herein in their entireties.

BACKGROUND

1. Technical Field

The present invention relates to wireless communications, and more particularly, to a method of controlling a transmit power in a wireless communication system.

2. Related Art

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future.

To exchange data between a base station (BS) and a user equipment (UE) in the wireless communication system, there is a need to control a transmit power for a transmit signal. In particular, transmit power control of an uplink channel is important in terms of power consumption of the UE and service reliability. In uplink transmission, if a transmit power is too weak, the BS cannot receive a transmit signal of the UE. On the contrary, if the transmit power is too strong, the transmit signal may act as interference to a transmit signal of another UE, and may increase battery consumption of the UE.

A transmit power control (TPC) command is generally used to control a transmit power of a channel between the BS and the UE. In the conventional WCDMA system, the TPC command is used in both uplink and downlink transmission. A dedicated physical uplink channel (DPCCH) is an uplink channel for carrying a TPC command for a downlink channel. A dedicated physical channel (DPCH) is a downlink channel for carrying a TCP command for an uplink channel. A structure of the DPCH may be found in section 5.3.2 of the 3GPP TS 25.211 V7.0.0 (2006-03) "Technical Specification Group Radio Access Network; Physical channels and mapping of transport channels onto physical channels (FDD) (Release 7)". The DPCCH and the DPCH are dedicated channels used only between a UE and a BS.

An evolved-UMTS terrestrial radio access network (E-UTRAN) system based on orthogonal frequency division multiple access (OFDMA) is currently being standardized. The E-UTRAN system is also referred to as a long term evolution (LTE) system. Examples of downlink physical channels used in the E-UTRAN include a physical downlink control channel (PDCCH) and a physical downlink shared channel (PDSCH). Unlike the WCDMA system, the PDCCH is only one physical control channel in the E-UTRAN. The PDCCH can carry dedicated control information for a UE or common control information for all UEs in a cell. Examples of uplink physical channels include a physical uplink control channel (PUCCH) and a physical uplink shared channel (PUSCH).

In general, in order for a BS to transmit a TPC command to a UE, when the BS reports downlink resource allocation information and/or uplink resource allocation information to the UE, the TPC command is transmitted on the PDCCH together with the reported information. The downlink resource allocation information is transmitted when there is data to be transmitted by the BS to the UE. The uplink resource allocation information is transmitted after the UE requests the BS to allocate resources. However, the TPC command cannot be transmitted to the UE when neither the downlink resource allocation information nor the uplink resource allocation information is transmitted. For example, when the UE transmits or receives a voice over Internet protocol (VoIP) packet by using radio resources pre-allocated through semi-persistent scheduling, the UE may not be able to receive the TPC command since resource allocation information is unnecessary.

When only the TPC command is transmitted for power control to the UE through one type of PDCCH, radio resources may be ineffectively used since a size of the PDCCH is significantly large while a size of the TPC command is only several bits.

Accordingly, there is a need for a method capable of effectively transmitting a TPC command to a UE through a PDCCH.

SUMMARY

The present invention provides a method of controlling a transmit power of an uplink channel in a wireless communication system.

The present invention also provides a method of transmitting a transmit power control (TPC) command for controlling a transmit power.

In an aspect, a method of controlling a transmit power of an uplink channel in a wireless communication system is provided. The method includes receiving downlink control information on a downlink control channel, wherein the downlink control information comprises at least one transmit power control (TPC) command and Cyclic Redundancy Check (CRC) parity bits of the downlink control information are masked with a TPC identifier, and adjusting the transmit power of the uplink channel based on the at least one TPC command.

In some embodiments, the downlink control channel may be a Physical Downlink Control Channel (PDCCH) and the uplink channel may be a Physical Uplink Control Channel (PUCCH) or a Physical Uplink Shared Channel (PUSCH). The PUCCH and the PUSCH may use different TPC identifiers. The TPC identifier may be received from a base station. The size of the TPC identifier may be 16 bits.

In some embodiments, The downlink control information comprises a plurality of TPC commands. The TPC command may be indicated by a TPC index. The TPC index may be received from a base station.

In another aspect, an apparatus for wireless communication includes a Radio Frequency (RF) unit for transmitting and receiving radio signals, and a processor coupled with the RF unit and configured to receive downlink control information on a downlink control channel, wherein the downlink control information comprises at least one transmit power control (TPC) command and Cyclic Redundancy Check (CRC) parity bits of the downlink control information are masked with a TPC identifier, and adjust a transmit power of an uplink channel based on the at least one TPC command.

In still another aspect, a method of transmitting transmit power control (TPC) commands for controlling a transmit power of an uplink channel in a wireless communication system includes preparing downlink control information which comprises a plurality of TPC commands, attaching Cyclic Redundancy Check (CRC) parity bits to the downlink control information, masking the CRC parity bits with a TPC identifier, and transmitting the CRC-masked downlink control information.

In still another aspect, an apparatus for wireless communication includes a control channel generator configured to attach CRC parity bits to downlink control information which comprises a plurality of TPC commands, and to mask the CRC parity bits with a TPC identifier, and a transceiver for transmitting the CRC-masked downlink control information.

In still another aspect, an apparatus for wireless communication includes a RF unit for transmitting and receiving radio signals, and a processor coupled with the RF unit and configured to monitor at least one downlink control channel by attempting decoding of the at least one downlink control channel, and acquire a TPC command on a downlink control channel when no CRC error is detected in the downlink control channel, wherein the CRC parity bits in the downlink control channel are masked with a TPC identifier.

In still another aspect, an apparatus for wireless communication includes a RF unit for transmitting and receiving radio signals, and a processor coupled with the RF unit and configured to receive a TPC index, and acquire a TPC command from a plurality of TPC commands based on the TPC index, wherein the plurality of TPC commands are included in the downlink control information carried by the downlink control channel and the CRC parity bits of the downlink control information are masked with a TPC identifier.

In still another aspect, an apparatus for wireless communication includes a RF unit for transmitting and receiving radio signals, and a processor coupled with the RF unit and configured to receive a TPC index and a TPC identifier, monitor at least one downlink control channel by attempting decoding of the at least one downlink control channel, acquire a TPC command on a downlink control channel based on the TPC index when no CRC error is detected in the downlink control channel, wherein the CRC parity bits in the downlink control channel are masked with the TPC identifier, and adjust a transmit power of an uplink channel based on the TPC command.

In still another aspect, an apparatus for wireless communication includes a RF unit for transmitting and receiving radio signals, and a processor coupled with the RF unit and configured to monitor at least one downlink control channel by attempting decoding of the at least one downlink control channel, acquire a TPC command on a downlink control channel when no CRC error is detected in the downlink control channel, wherein the CRC parity bits in the downlink control channel are masked with a first TPC identifier or a second TPC identifier, adjust a transmit power of a first uplink channel based on the TPC command when the CRC parity bits in the downlink control channel are masked with a first TPC identifier, and adjust a transmit power of a second uplink channel based on the TPC command when the CRC parity bits in the downlink control channel are masked with a second TPC identifier.

BRIEF DESCRIPTION OF THE DRAWINGS

FIG. 18 is a flowchart showing a transmit power control method according to an embodiment of the present invention.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). A third generation partnership project (3GPP) long term evolution (LTE) is a part of an evolved UMTS (E-UMTS) using the E-UTRA. The 3GPP LTE uses the OFDMA in downlink and uses the SC-FDMA in uplink. An LTE-advance (LTE-A) is an evolution of the 3GPP LTE.

For clarity, the following description will focus on the 3GPP LTE/LTE-A. However, technical features of the present invention are not limited thereto.

Figure 1:
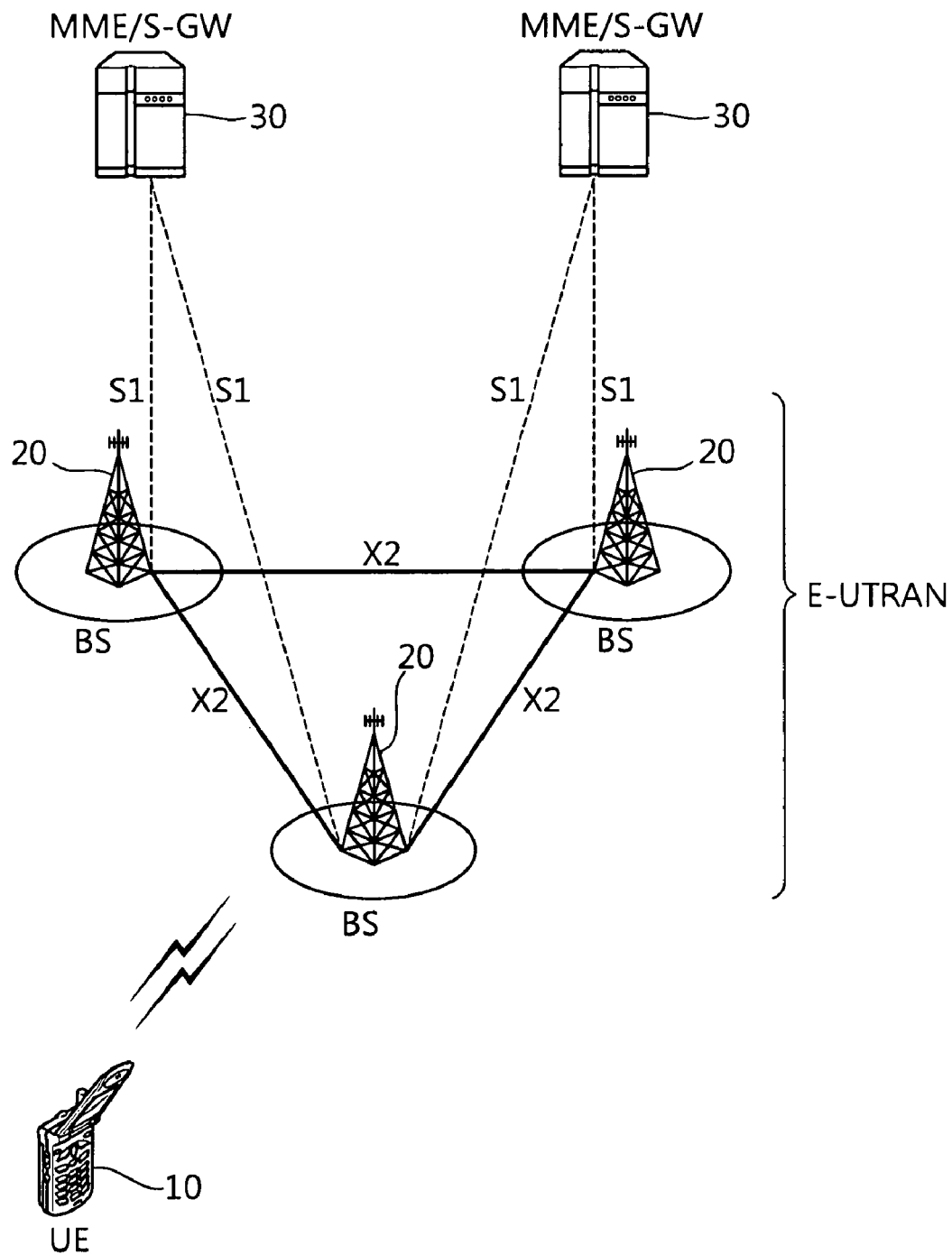
FIG. 1 shows a structure of a wireless communication system.

FIG. 1 shows a structure of a wireless communication system. The wireless communication system may have a network structure of an evolved-universal mobile telecommunications system (E-UMTS). The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

Figure 2:
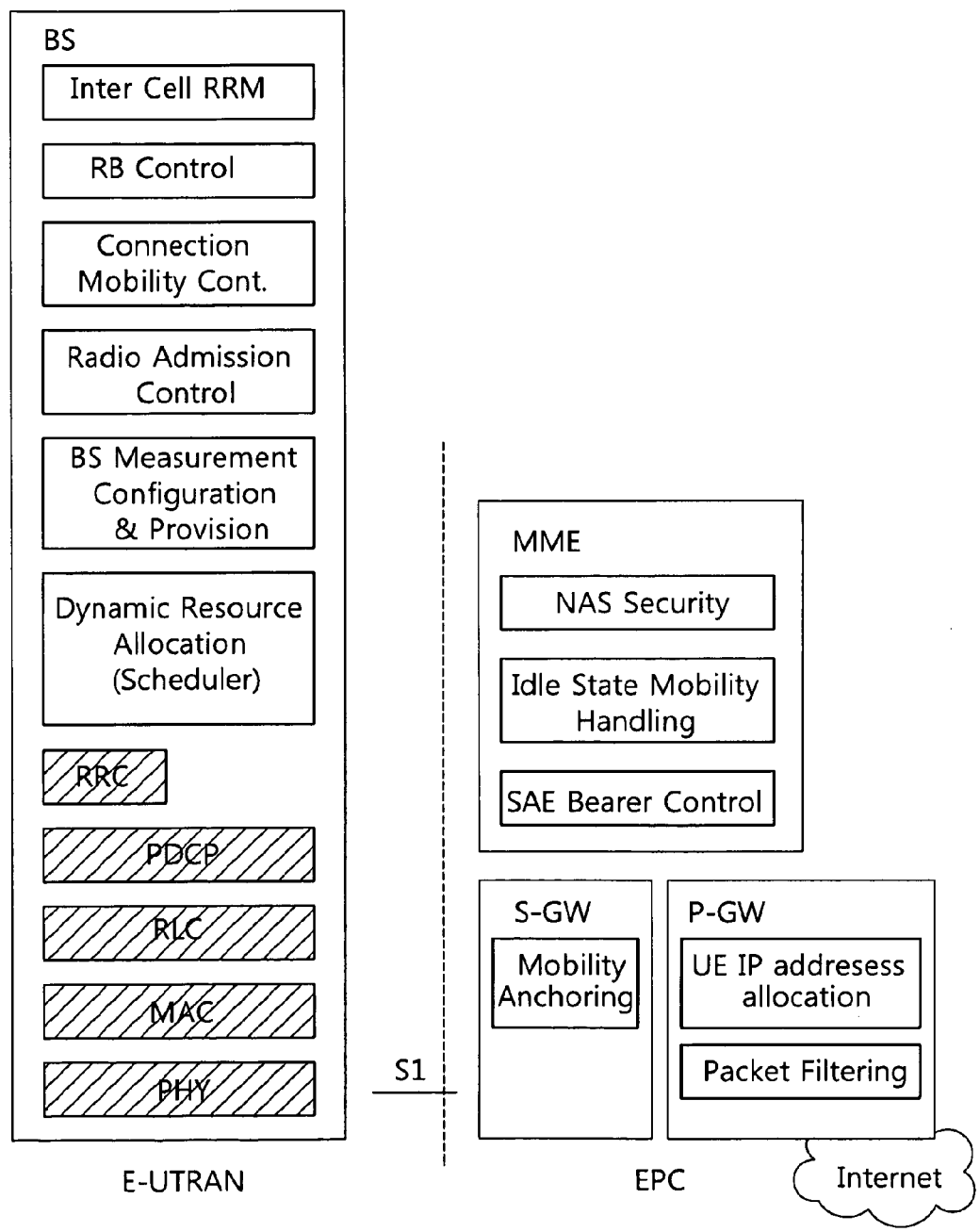
FIG. 2 is a diagram showing functional split between an evolved universal terrestrial radio access network (E-UTRAN) and an evolved packet core (EPC).

FIG. 2 is a diagram showing functional split between the E-UTRAN and the EPC. Slashed boxes depict radio protocol layers and white boxes depict functional entities of the control plane.

Referring to FIG. 2, the BS performs the following functions: (1) functions for radio resource management (RRM) such as radio bearer control, radio admission control, connection mobility control, and dynamic allocation of resources to the UE; (2) Internet protocol (IP) header compression and encryption of user data streams; (3) routing of user plane data to the S-GW; (4) scheduling and transmission of paging messages; (5) scheduling and transmission of broadcast information; and (6) measurement and measurement reporting configuration for mobility and scheduling.

The MME performs the following functions: (1) non-access stratum (NAS) signaling; (2) NAS signaling security; (3) idle mode UE reachability; (4) tracking area list management; (5) roaming; and (6) authentication.

The S-GW performs the following functions: (1) mobility anchoring; and (2) lawful interception. A PDN gateway (P-GW) performs the following functions: (1) UE IP allocation; and (2) packet filtering.

Figure 3:
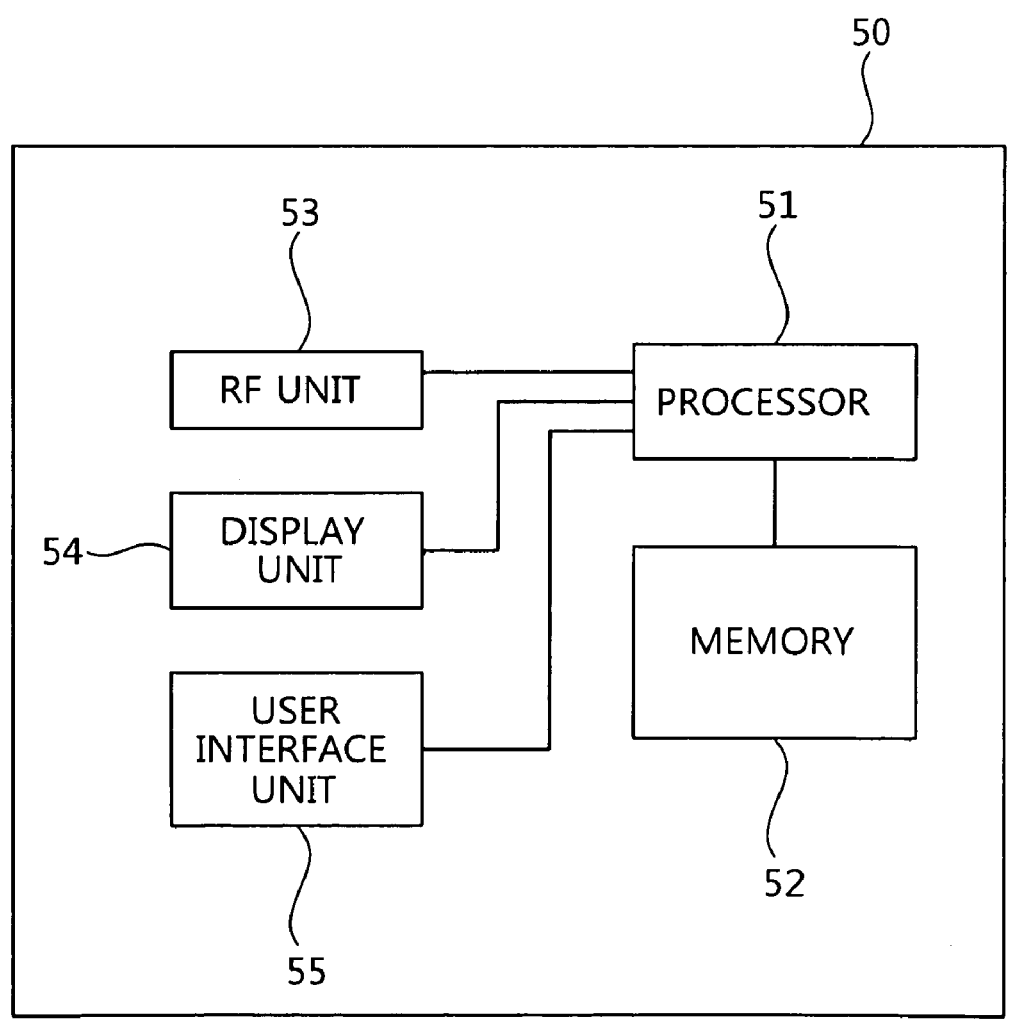
FIG. 3 is a block diagram showing constitutional elements of a user equipment.

FIG. 3 is a block diagram showing constitutional elements of an apparatus for wireless communication. The apparatus may be a part of the UE. The apparatus includes a processor 51, a memory 52, a radio frequency (RF) unit 53, a display unit 54, and a user interface unit 55. Layers of the radio interface protocol are implemented in the processor 51. The processor 51 provides the control plane and the user plane. The function of each layer can be implemented in the processor 51. The memory 52 is coupled to the processor 51 and stores various parameters for operation of the processor 51. The display unit 54 displays a variety of information of the apparatus 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

Figure 4:
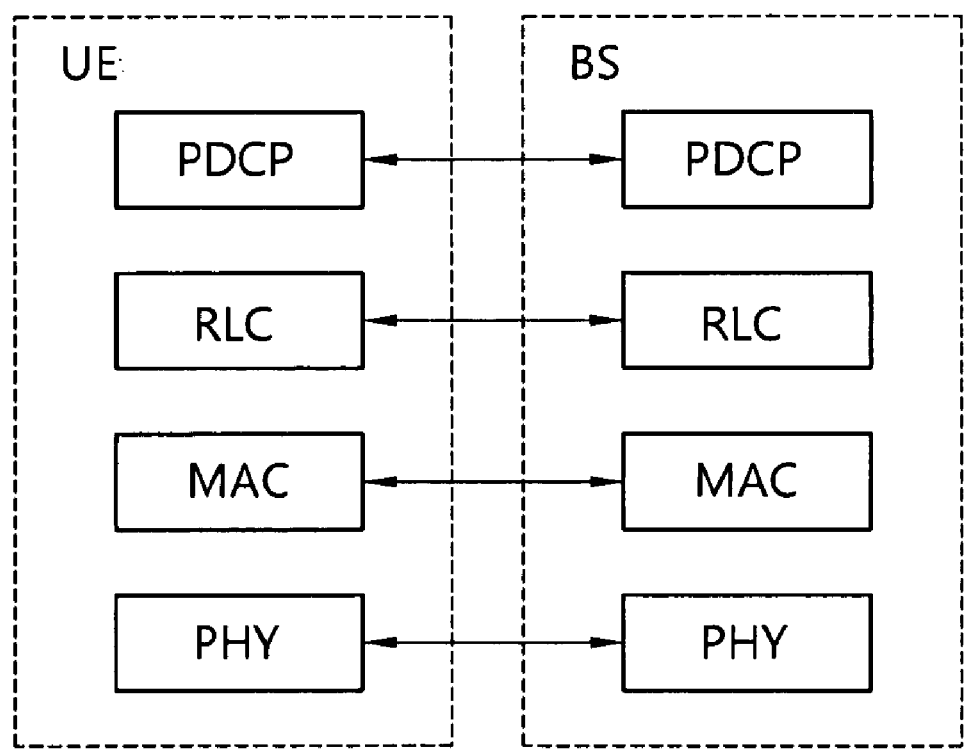
FIG. 4 is a diagram showing a radio protocol architecture for a user plane.
Figure 5:
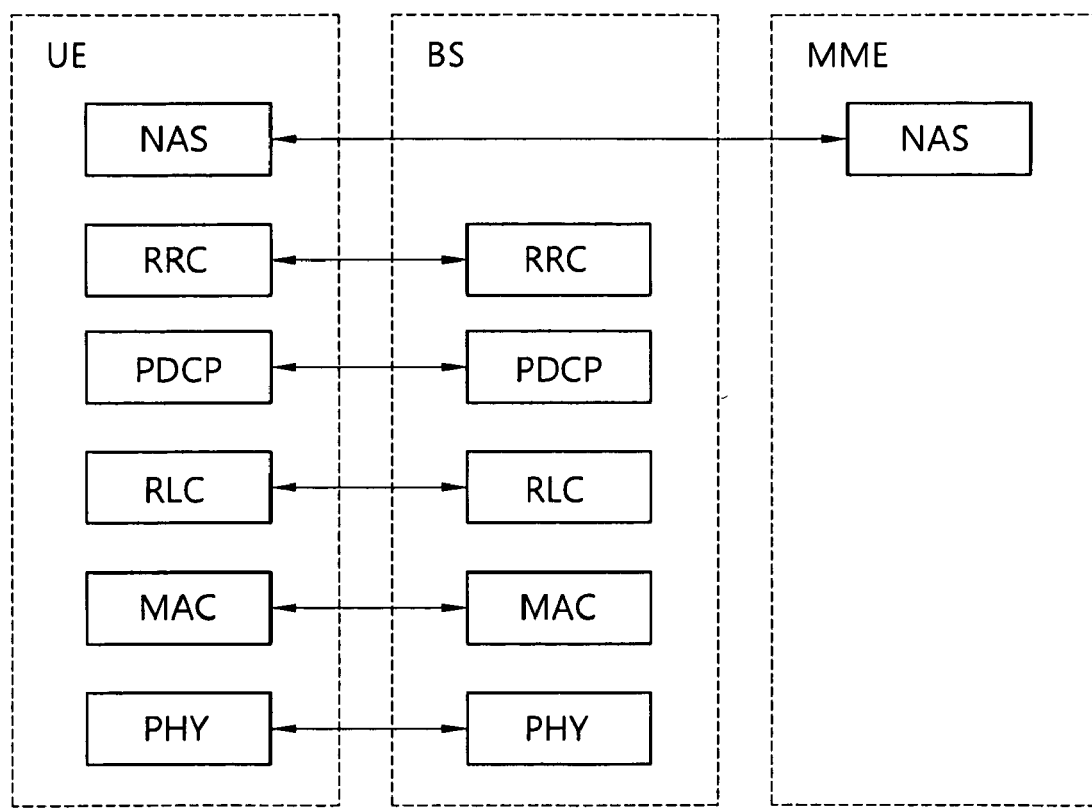
FIG. 5 is a diagram showing a radio protocol architecture for a control plane.

FIG. 4 is a diagram showing a radio protocol architecture for the user plane. FIG. 5 is a diagram showing a radio protocol architecture for the control plane. They illustrate the architecture of a radio interface protocol between the UE and the E-UTRAN. The user plane is a protocol stack for user data transmission. The control plane is a protocol stack for control signal transmission.

Referring to FIGS. 4 and 5, a PHY layer belongs to the first layer and provides an upper layer with an information transfer service through a physical channel. The PHY layer is coupled with a medium access control (MAC) layer, i.e., an upper layer of the PHY layer, through a transport channel. Data is transferred between the MAC layer and the PHY layer through the transport channel. Between different PHY layers (i.e., a PHY layer of a transmitter and a PHY layer of a receiver), data is transferred through the physical channel.

The MAC layer belongs to the second layer and provides services to a radio link control (RLC) layer, i.e., an upper layer of the MAC layer, through a logical channel. The RLC layer in the second layer supports reliable data transfer. There are three operating modes in the RLC layer, that is, a transparent mode (TM), an unacknowledged mode (UM), and an acknowledged mode (AM) according to a data transfer method. An AM RLC provides bidirectional data transmission services and supports retransmission when the transfer of the RLC protocol data unit (PDU) fails.

A packet data convergence protocol (PDCP) layer belongs to the second layer and performs a header compression function for reducing an IP packet header size.

A radio resource control (RRC) layer belongs to the third layer and is defined only in the control plane. The RRC layer serves to control the logical channel, the transport channel, and the physical channel in association with configuration, reconfiguration and release of radio bearers (RBs). An RB is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Figure 6:
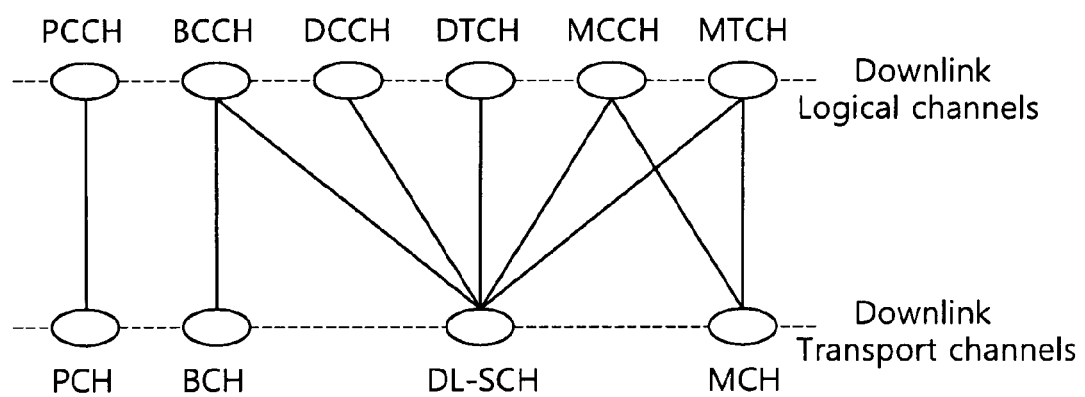
FIG. 6 shows mapping between downlink logical channels and downlink transport channels.
Figure 7:
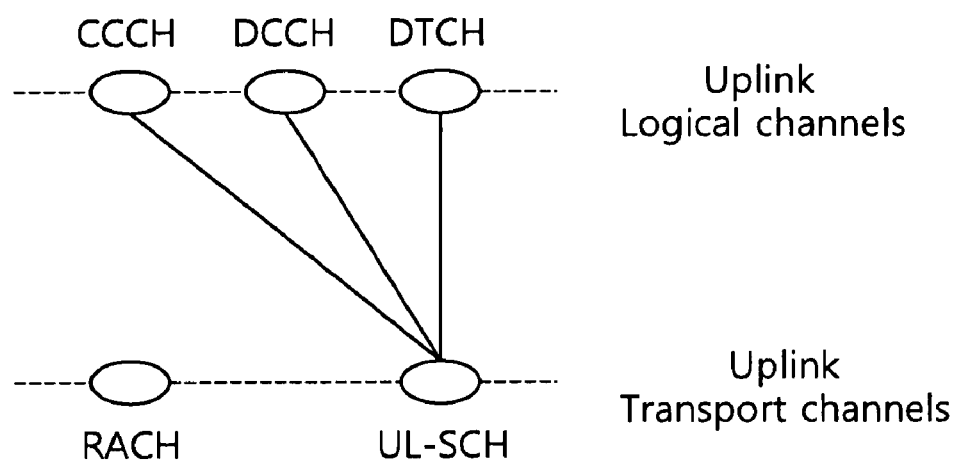
FIG. 7 shows mapping between uplink logical channels and uplink transport channels.

FIG. 6 shows mapping between downlink logical channels and downlink transport channels. FIG. 7 shows mapping between uplink logical channels and uplink transport channels. This may be found in section 6.1.3 of the 3GPP TS 36.300 V8.3.0 (2007-12) "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)".

Referring to FIGS. 6 and 7, in downlink, a paging control channel (PCCH) is mapped to a paging channel (PCH). A broadcast control channel (BCCH) is mapped to a broadcast channel (BCH) or a downlink shared channel (DL-SCH). A common control channel (CCCH), a dedicated control channel (DCCH), a dedicated traffic channel (DTCH), a multicast control channel (MCCH), and a multicast traffic channel (MTCH) are mapped to the DL-SCH. The MCCH and the MTCH are also mapped to a multicast channel (MCH). In uplink, the CCCH, the DCCH, and the DTCH are mapped to an uplink shared channel (UL-SCH).

A type of each logical channel is defined according to a type of information to be transmitted. A logical channel is classified into two groups, i.e., a control channel and a traffic channel.

The control channel is used for transmitting control plane information. The BCCH is a downlink control channel for broadcasting system control information. The PCCH is a downlink channel for transmitting paging information and is used when a network does not know the location of the UE. The CCCH is a channel for transmitting control information between the UE and the network and is used when there is no RRC connection established between the UE and the network. The MCCH is a point-to-multipoint downlink channel used for transmitting multimedia broadcast multicast service (MBMS) control information from the network to the UE. The MCCH is used by UEs that receive an MBMS. The DCCH is a point-to-point bi-directional channel for transmitting dedicated control information between the UE and the network, and is used by UEs having an RRC connection.

The traffic channel is used for transmitting user plane information. The DTCH is a point-to-point channel for transmitting user information. The DTCH can exist in both uplink and downlink. The MTCH is a point-to-multipoint downlink channel for transmitting traffic data and is used by the UEs that receive the MBMS.

The transport channel is classified according to a type and characteristic of data transmission through a radio interface. The BCH is broadcast in the entire coverage area of the cell and has a fixed, pre-defined transport format. The DL-SCH is characterized by support for hybrid automatic repeat request (HARQ), support for dynamic link adaptation by varying modulation, coding, and a transmit power, a possibility to be broadcast in the entire cell, and a possibility to use beamforming, support for both dynamic and semi-static resource assignment, support for UE discontinuous reception (DRX) to enable UE power saving, and support for MBMS transmission. The PCH is characterized by support for DRX to enable UE power saving and requirement to be broadcast in the entire coverage area of the cell. The MCH is characterized by support for requirement to be broadcast in the entire coverage area of the cell and support for an MBMS single frequency network (MBSFN).

The UL-SCH and a random access channel (RACH) are uplink transport channels. The UL-SCH is characterized by support for dynamic link adaptation for changing the modulation, coding, and a transmit power and support for HARQ and dynamic/semi-static resource assignment. The RACH is characterized by limited control information and collision risk.

Figure 8:
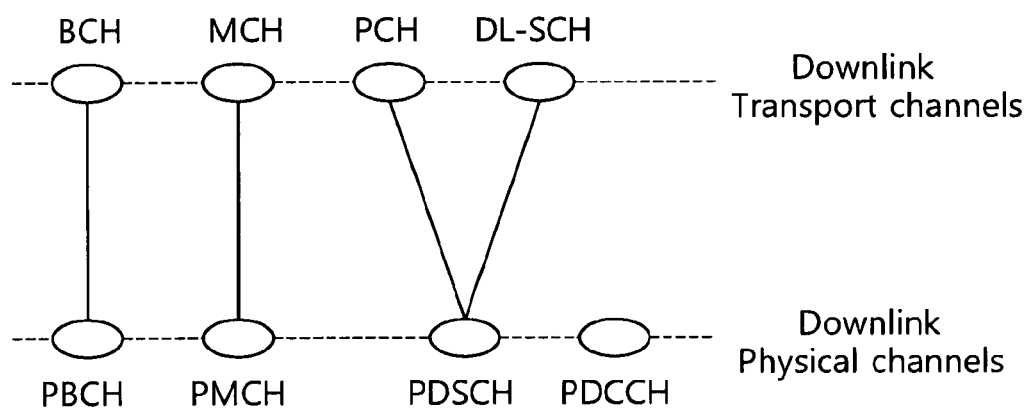
FIG. 8 shows mapping between downlink transport channels and downlink physical channels.
Figure 9:
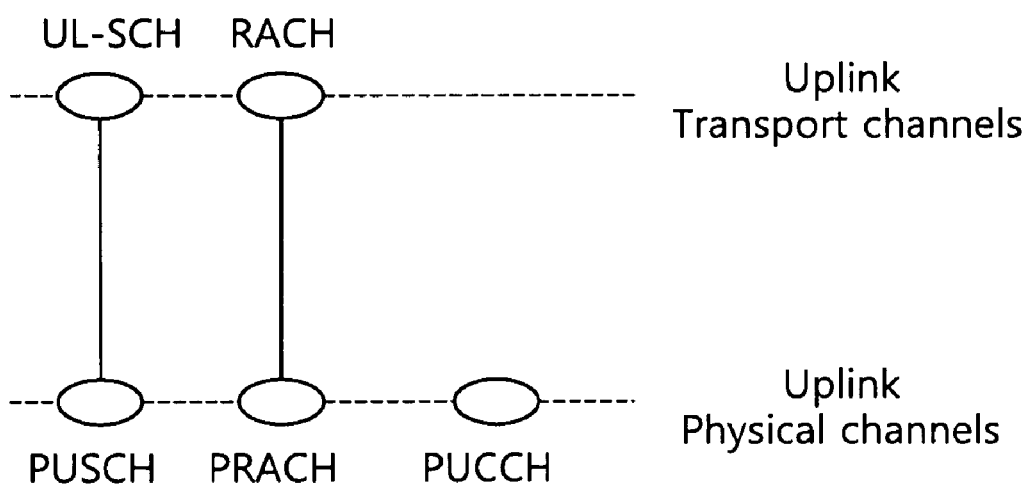
FIG. 9 shows mapping between uplink transport channels and uplink physical channels.

FIG. 8 shows mapping between downlink transport channels and downlink physical channels. FIG. 9 shows mapping between uplink transport channels and uplink physical channels.

Referring to FIGS. 8 and 9, in downlink, a BCH is mapped to a physical broadcast channel (PBCH). An MCH is mapped to a physical multicast channel (PMCH). A PCH and a DL-SCH are mapped to a physical downlink shared channel (PDSCH). The PBCH carries a BCH transport block. The PMCH carries the MCH. The PDSCH carries the DL-SCH and the PCH. In uplink, a UL-SCH is mapped to a physical uplink shared channel (PUSCH). An RACH is mapped to a physical random access channel (PRACH). The PRACH carries a random access preamble.

There are several physical control channels used in a PHY layer. A physical downlink control channel (PDCCH) informs the UE of resource assignment of the PCH and DL-SCH, and also informs the UE of HARQ information related to the DL-SCH. The PDCCH may carry an uplink scheduling grant which informs the UE of resource assignment for uplink transmission. A physical control format indicator channel (PCFICH) informs the UE of the number of orthogonal frequency division multiplexing (OFDM) symbols used for the PDCCHs and is transmitted in every subframe. A physical hybrid ARQ indicator channel (PHICH) carries HARQ acknowledgement (ACK)/negative-acknowledgement (NACK) signals in response to uplink transmission. A physical uplink control channel (PUCCH) carries HARQ ACK/NACK signals in response to downlink transmission, scheduling request, and uplink control information (e.g., a channel quality indicator (CQI)).

Figure 10:
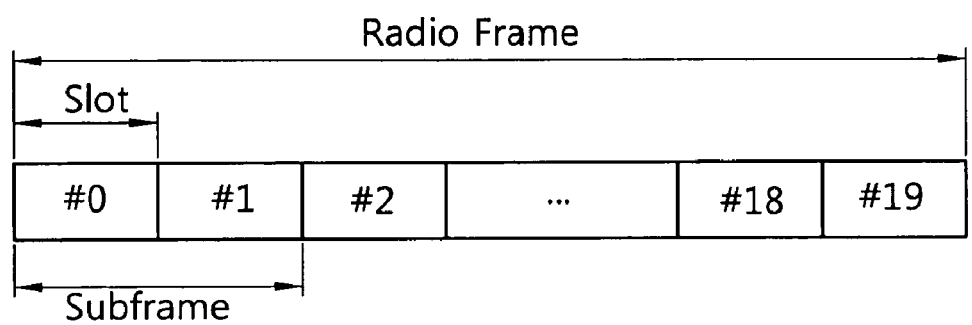
FIG. 10 shows a structure of a radio frame.

FIG. 10 shows a structure of a radio frame.

Referring to FIG. 10, a radio frame includes 10 subframes. One subframe includes two slots. A time for transmitting one subframe is defined as a transmission time interval (TTI). For example, one subframe may have a length of 1 millisecond (ms), and one slot may have a length of 0.5 ms.

The radio frame of FIG. 10 is shown for exemplary purposes only. Thus, the number of subframes included in the radio frame or the number of slots included in the subframe or the number of OFDM symbols included in the slot may change variously.

Figure 11:
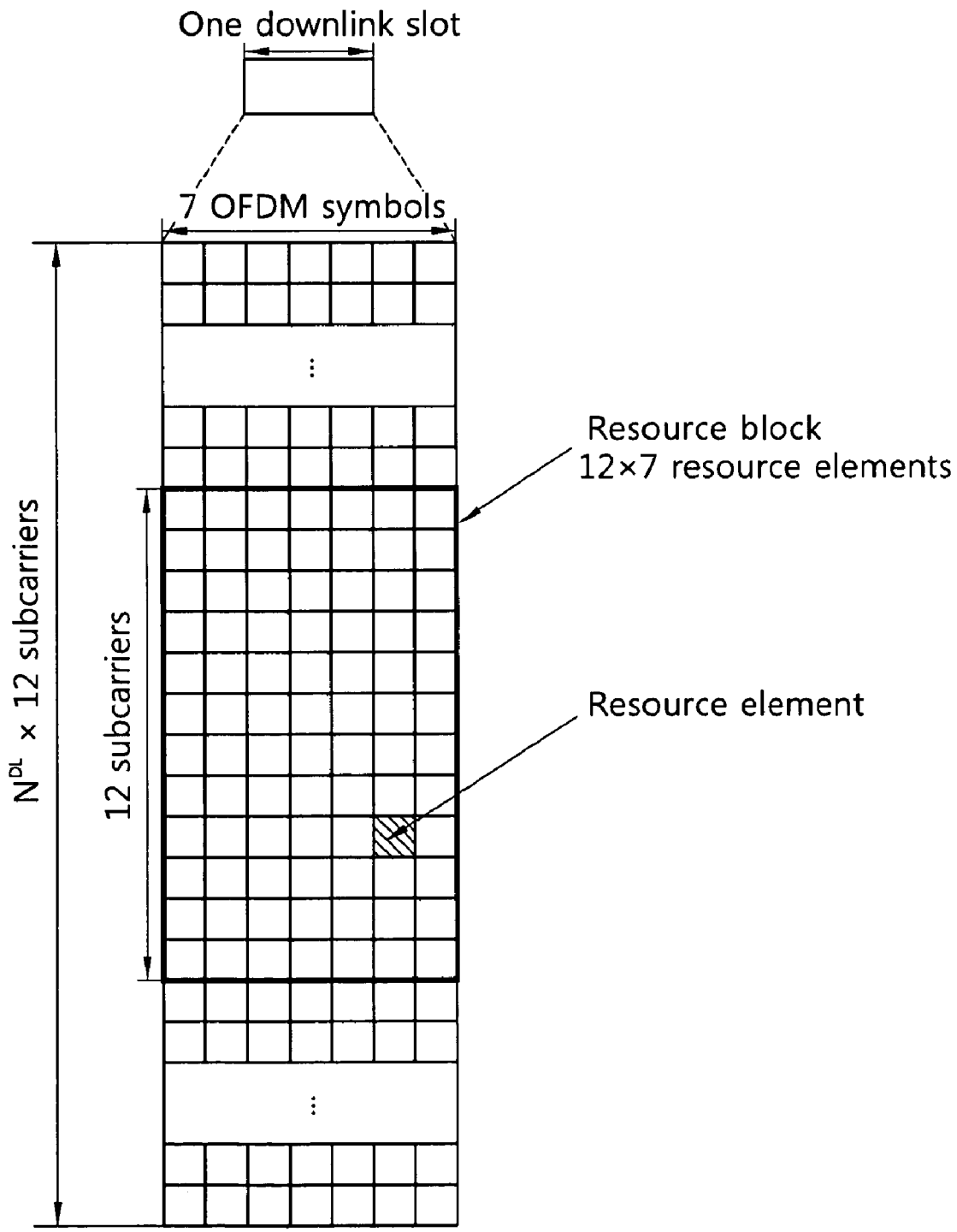
FIG. 11 shows an example of a resource grid for one downlink slot.

FIG. 11 shows an example of a resource grid for one downlink slot.

Referring to FIG. 11, the downlink slot includes a plurality of OFDM symbols in a time domain. Although it is described herein that one downlink slot includes 7 OFDM symbols and one resource block includes 12 subcarriers in a frequency domain, this is for exemplary purposes only, and thus the present invention is not limited thereto.

Elements on the resource grid are referred to as resource elements. One resource block includes 12×7 resource elements. The number $N^{DL}$ of resource blocks included in the downlink slot depends on a downlink transmission bandwidth determined in a cell.

Figure 12:
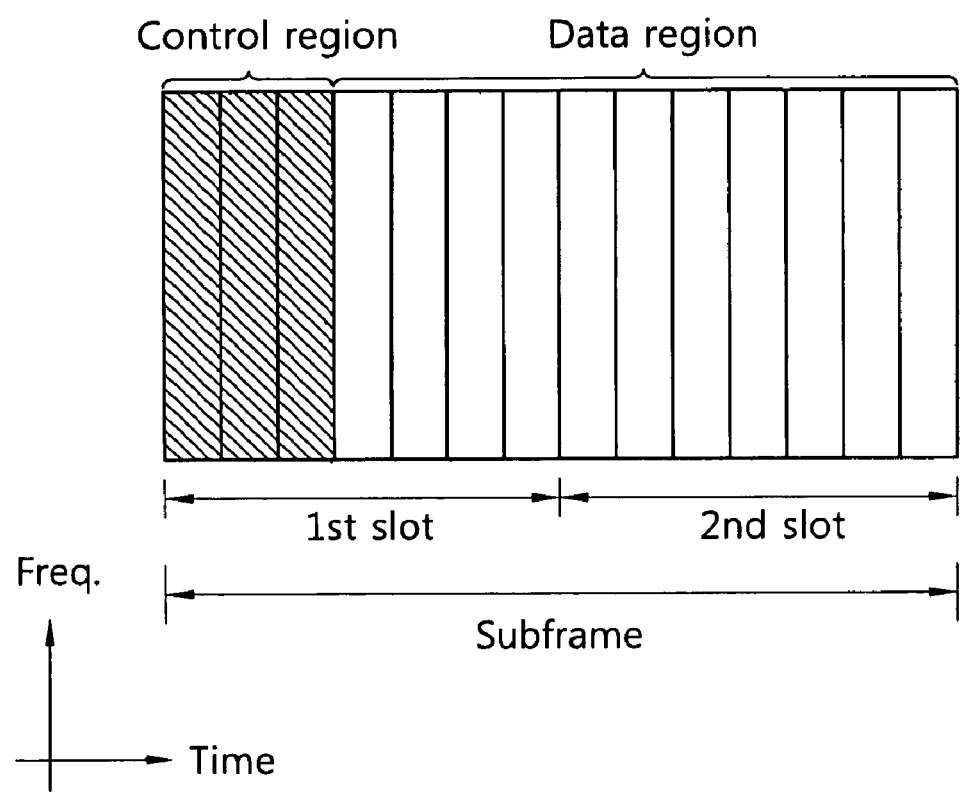
FIG. 12 shows a structure of a subframe.

FIG. 12 shows a structure of a subframe.

Referring to FIG. 12, the subframe includes two consecutive slots. Up to three OFDM symbols located in a front portion of a $1^{st}$ slot within the subframe are included in a control region to be assigned with a PDCCH. The remaining OFDM symbols are included in a data region to be assigned with a PDSCH. A PCFICH carries information regarding the number of OFDM symbols used to transmit PDCCHs within the subframe.

The PDCCH may carry a transport format related to the DL-SCH and the PCH, resource allocation information, and/or a transmit power control (TPC) command. A plurality of PDCCHs can be transmitted in the control region. The UE monitors the plurality of PDCCHs. The PDCCH may be transmitted on an aggregation of one or several contiguous control channel elements (CCEs). The CCEs correspond to a plurality of resource element groups. A PDCCH format and the number of bits of an available PDCCH are determined according to the number of CCEs.

Control information transmitted through the PDCCH is referred to as downlink control information (DCI). The DCI is used to transmit uplink or downlink scheduling information or to transmit a TPC command for uplink power control. A DCI format includes a format 0 for transmission of uplink shared channel (UL-SCH) allocation, a format 1 for transmission of DL-SCH allocation for a single input multiple output (SIMO) operation, a format 1A for compact transmission of DL-SCH allocation for the SIMO operation, a format 2 for transmission of DL-SCH allocation for a multiple input multiple output (MIMO) operation, and formats 3 and 3A for transmission of a TPC command for an uplink channel.

Table 1 below shows information included in each DCI format.

TABLE 1

| Format | Information |
| --- | --- |
| Format 0 | UL-SCH assignment |
| | TPC command for PUSCH |
| Format 1 | DL-SCH assignment |
| | TPC command for PUCCH |
| Format 1A | DL-SCH assignment |
| | TPC command for PUCCH |
| Format 2 | DL-SCH assignment |
| | TPC command for PUCCH |
| Format 3 | TPC commands for UE 1, UE 2, ..., UE N |
| Format 3A | TPC commands for UE 1, UE 2, ..., UE 2N |

The formats 0 to 2 correspond to control information for one UE and include a TPC command for an uplink channel. The formats 3 and 3A include TPC commands for a plurality of UEs. Unlike the formats 0 to 2 received by one UE, the formats 3 and 3A are received by the plurality of UEs. The number of bits of the TPC command for the format 3 is different from the number of bits of the TCP command for the format 3A. For example, if the format 3 includes a 2-bit TPC command for power control, the format 3A includes a 1-bit TPC command for power control. In this case, regarding the same DCI size, the number of TPC commands included in the format 3A is twice the number of TPC commands included in the format 3.

Figure 13:
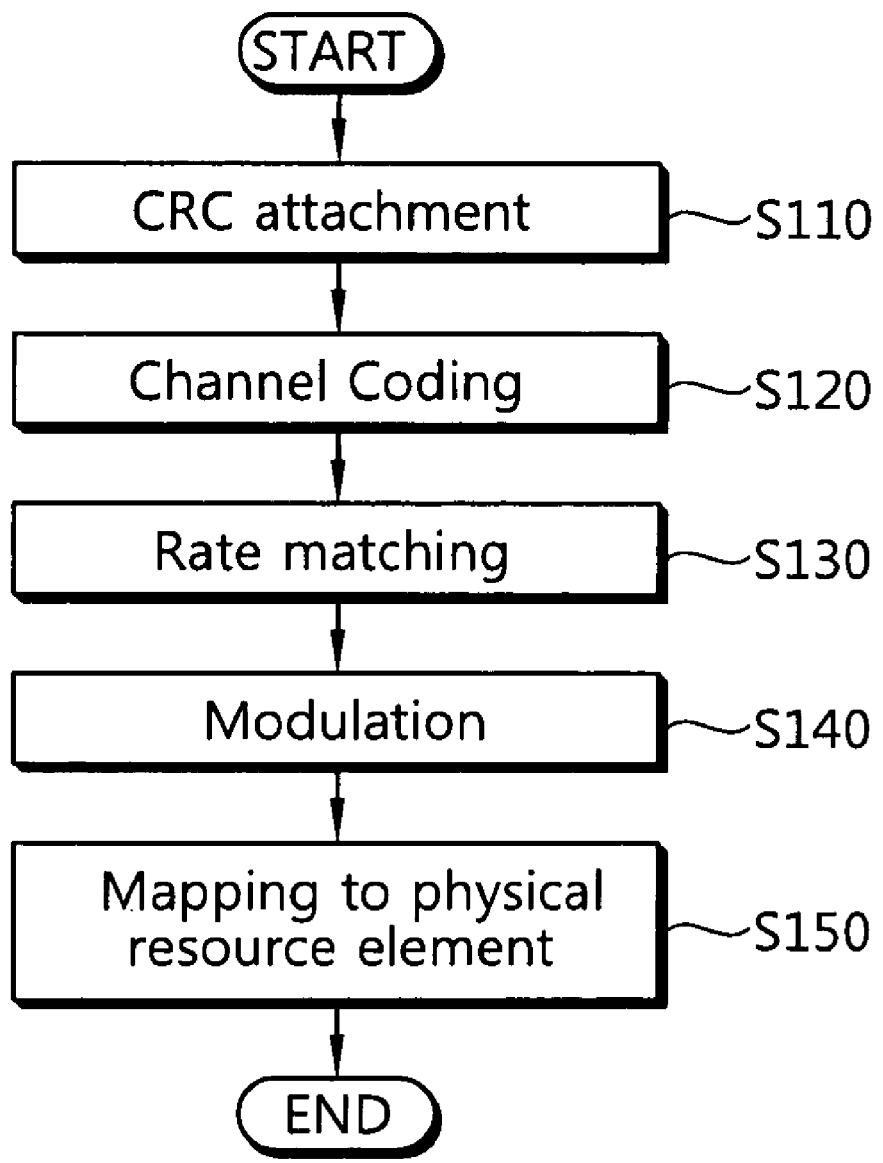
FIG. 13 is a flowchart showing a process of configuring a physical downlink control channel (PDCCH).

FIG. 13 is a flowchart showing a process of configuring a PDCCH.

Referring to FIG. 13, in step S110, the BS determines a PDCCH format according to a DCI to be transmitted to the UE, and attaches cyclic redundancy check (CRC) parity bits to control information. A unique identifier (i.e., a radio network temporary identifier (RNTI)) is masked on the CRC parity bits according to a usage or an owner of the PDCCH. If the PDCCH is for a specific UE, a unique identifier (e.g., cell-RNTI (C-RNTI)) of the UE can be masked on the CRC parity bits. If the PDCCH is for paging information, a paging indication-RNTI (PI-RNTI) can be masked on the CRC parity bits. If the PDCCH is for system information, a system information identifier (e.g., system information-RNTI (SI-RNTI)) can be masked on the CRC parity bits. In order to indicate a random access response that is a response for transmission of a random access preamble of the UE, a random access-RNTI (RA-RNTI) can be masked on the CRC parity bits. Table 2 below shows an example of identifiers masked on the CRC parity bits of the PDCCH.

TABLE 2

| Type | Identifier | Description |
| --- | --- | --- |
| UE-specific | C-RNTI | used for the UE corresponding to the C-RNTI |
| Common | PI-RNTI | used for paging message |
| | SI-RNTI | used for system information |
| | RA-RNTI | used for random access response |

When using the C-RNTI, the PDCCH carries dedicated control information for a specific UE. When using other RNTIs, the PDCCH carries common control information to be received by all (or a plurality of) UEs in a cell.

In step S120, channel coding is performed on the CRC-attached control information to generate coded data. In step S130, rate matching is performed according to the number of CCEs assigned to the PDCCH format. In step S140, the coded data is modulated to generate modulation symbols. In step S150, the modulation symbols are mapped to physical resource elements.

A plurality of PDCCHs can be transmitted in one subframe. The UE monitors the plurality of PDCCHs. Monitoring is an operation in which the UE attempts decoding of the respective PDCCHs according to formats of the monitored PDCCHs. In the control region assigned in the subframe, the BS does not provide information indicating a location of a corresponding PDCCH to the UE. The UE searches for its PDCCH by monitoring a group of PDCCH candidates from a logical search space configured in the control region. For example, the UE performs de-masking on its C-RNTI from a corresponding PDCCH candidate, and it is regarded that the UE detects its PDCCH if a CRC error is not detected.

The search space is a logical space for searching PDCCH. The group of PDCCH candidates to be monitored is defined according to the search space. If an aggregation of all CCEs for the PDCCH in one subframe is defined as a CCE aggregation, the search space denotes an aggregation of contiguous CCEs starting at a specific starting position in the CCE aggregation according to an aggregation level. An aggregation level L is a CCE unit for PDCCH search. A size of the aggregation level L is defined by the number of contiguous CCEs. The search space is defined according to the aggregation level. In the search space, the PDCCH candidates are located with respect to every aggregation level size.

Now, transmit power control of a physical uplink shared channel (PUSCH) and a physical uplink control channel (PUCCH) in the LTE will be described. This may be found in section 5.1 of the 3GPP TS 36.213 V8.2.0 (2008-03) "Technical Specification Group Radio Access Network; Evolved Universal Terrestrial Radio Access (E-UTRA); Physical layer procedures (Release 8)".

The transmit power $P_{PUSCH}$ for the PUSCH transmission in a subframe i is defined by:

$$P_{PUSCH}(i) = \min\{P_{MAX}, 10 \log_{10}(M_{PUSCH}(i)) + P_{O\_PUSCH}(j) + \alpha \cdot PL + \Delta_{TF}(TF(i)) + f(i)\} \quad \text{Equation 1}$$

where $P_{MAX}$ is the maximum allowed power that depends on the UE power class, $M_{PUSCH}(i)$ is the size of the PUSCH resource assignment expressed in number of resource blocks valid for subframe i, $P_{O\_PUSCH}(j)$ is a parameter, $\alpha$ is a cell specific parameter, PL is the downlink pathloss estimate calculated in the UE, $\Delta_{TF}(TF(i))$ is a parameter, and f(i) is a current PUSCH power control adjustment state which is given by a UE specific correction value $\delta_{PUSCH}$ referred to as a TPC command.

The transmit power $P_{PUCCH}$ for the PUCCH transmission in subframe i is defined by:

$$P_{PUCCH}(i) = \min\{P_{MAX}, P_{O\_PUCCH} + PL + \Delta_{TF\_PUCCH}(TF) + g(i)\} \quad \text{Equation 2}$$

where $P_{MAX}$ is the maximum allowed power that depends on the UE power class, $P_{O\_PUCCH}(j)$ is a parameter, PL is the downlink pathloss estimate calculated in the UE, $\Delta_{TF\_PUCCH}(TF)$ are given by RRC, and g(i) is the current PUCCH power control adjustment state which is given by a UE specific correction value $\delta_{PUCCH}$ referred to as a TPC command.

Figure 14:
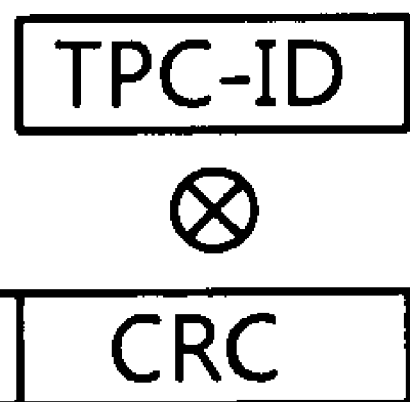
FIG. 14 shows an exemplary structure of a PDCCH for transmitting a transmit power control (TPC) command according to an embodiment of the present invention.

FIG. 14 shows an exemplary structure of a PDCCH for transmitting a TPC command according to an embodiment of the present invention.

Referring to FIG. 14, a TPC identifier (TPC-ID) is masked on CRC parity bits of DCI. The DCI includes TPC commands for a plurality of UEs. For example, the DCI may have the DCI format 3 or the DCI format 3A. The TPC-ID is an identifier to be de-masked when one or more UEs monitor a PDCCH that carries the TPC command. The TPC-ID may be an identifier to be used by a UE to decode the PDCCH in order to determine whether the TPC command is transmitted on the PDCCH.

Conventional identifiers (i.e., C-RNTI, PI-RNTI, SI-RNTI, and RA-RNTI) may be reused as the TPC-ID, or a new identifier may be defined as the TPC-ID.

The TPC-ID may be an identifier for a specific group of UEs in a cell to receive TPC commands. Thus, the TPC-ID may be differentiated from the C-RNTI which is an identifier for a specific UE and be differentiated from the PI-RNTI, SI-RNTI, and RA-RNTI which are identifiers for all UEs in the cell. When the DCI includes TPC commands for N UEs, the TPC commands may be received by the N UEs. If the DCI includes TPC commands for all UEs in the cell, the TPC-ID may be an identifier for all UEs in the cell.

A UE searches for the DCI masked with the TPC-ID by monitoring a group of PDCCH candidates from a search space in a subframe. In this case, the TPC-ID may be found either in a common search space or in a UE-specific search space. The common search space is a search space searched by all UEs in the cell. The UE-specific search space is a search space searched by a specific UE. If a CRC error is not detected when the TPC-ID is de-masked with respect to a corresponding PDCCH candidate, the UE can receive the TPC command on the PDCCH.

A TPC-ID for a PDCCH that carries only a plurality of TPC commands may be defined. The UE receives a TCP command on the PDCCH addressed by the TPC-ID. The TPC command is used to adjust a transmit power of an uplink channel. Therefore, transmission to the BS can be prevented from being failed due to incorrect power control, or interference to another UE can be mitigated.

Figure 15:
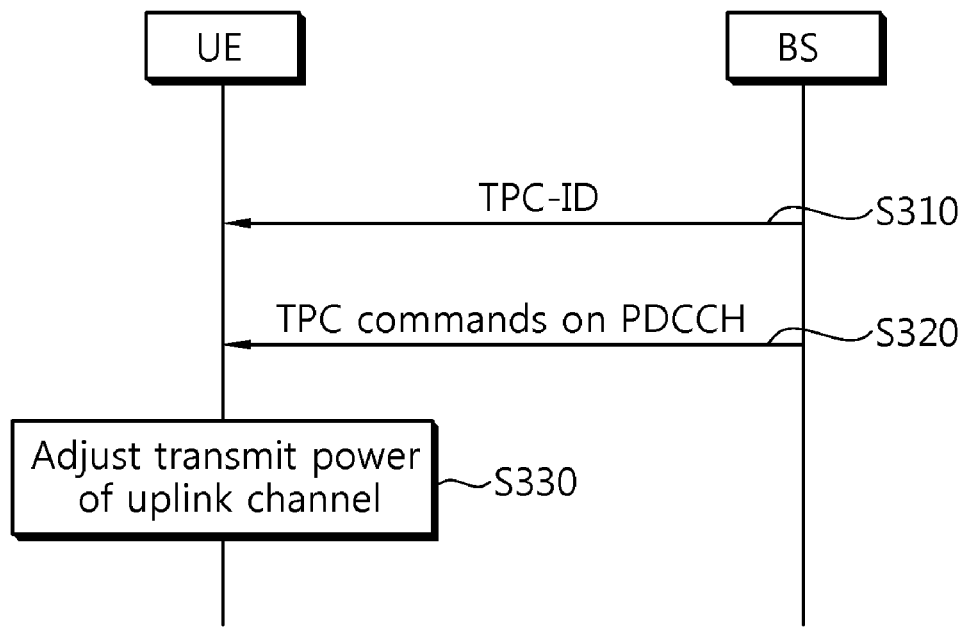
FIG. 15 is a flow diagram showing a transmit power control method according to an embodiment of the present invention.

FIG. 15 is a flow diagram showing a transmit power control method according to an embodiment of the present invention.

Referring to FIG. 15, in step S310, a BS transmits information regarding a TPC-ID to a UE. The BS can transmit the information regarding the TPC-ID by using at least one of a MAC message, an RRC message, and a control message on a PDCCH. The information regarding the TPC-ID may be a TPC-ID itself and/or information related to the TPC-ID. The information related to the TPC-ID includes the TPC-ID itself and/or a TPC index indicating a TPC command of a corresponding UE among a plurality of TPC commands included in DCI. The BS can divide UEs in a cell into at least one group, and can allocate the TPC-ID to each group.

The TPC-ID can be classified into a TPC-ID for a PUCCH and a TPC-ID for a PUSCH. This means that the TPC-ID to be used can be classified according to a type of an uplink channel that controls a transmit power. This also means that a first uplink channel and a second uplink channel can use different TPC-IDs. Upon detection of the TPC-ID for the PUCCH, the UE uses a corresponding TPC command to control a transmit power of the PUCCH. Upon detection of the TPC-ID for the PUSCH, the UE uses a corresponding TPC command to control a transmit power of the PUSCH.

Since the number of bits of the TPC command may differ from one UE to another, the TPC-ID can be classified according to the number of bits of the TPC command. For example, information may be necessary to identify a TPC-ID for the DCI format 3 and a TPC-ID for the DCI format 3A.

The TPC index indicates a TPC command for a given UE among a plurality of TPC commands included in the DCI formats 3 and 3A. The TPC index may have a format of an index for the TPC command or may have a bitmap format.

In step S320, the BS transmits TPC commands on the PDCCH. The UE monitors the PDCCH. If a CRC error is not detected by performing CRC de-masking using the TPC-ID, the UE receives a TPC command on the basis of a TPC index from the TPC commands included in corresponding DCI.

In step S330, the UE adjusts a transmit power of the uplink channel by using the received TPC command. According to the TPC-ID, a transmit power of the PUCCH or the PUSCH can be adjusted.

Now, a method of transmitting information regarding a TPC-ID by a BS to a UE will be described.

In a first embodiment, the BS can transmit the information regarding the TPC-ID to the UE by using a MAC message.

Figure 16:
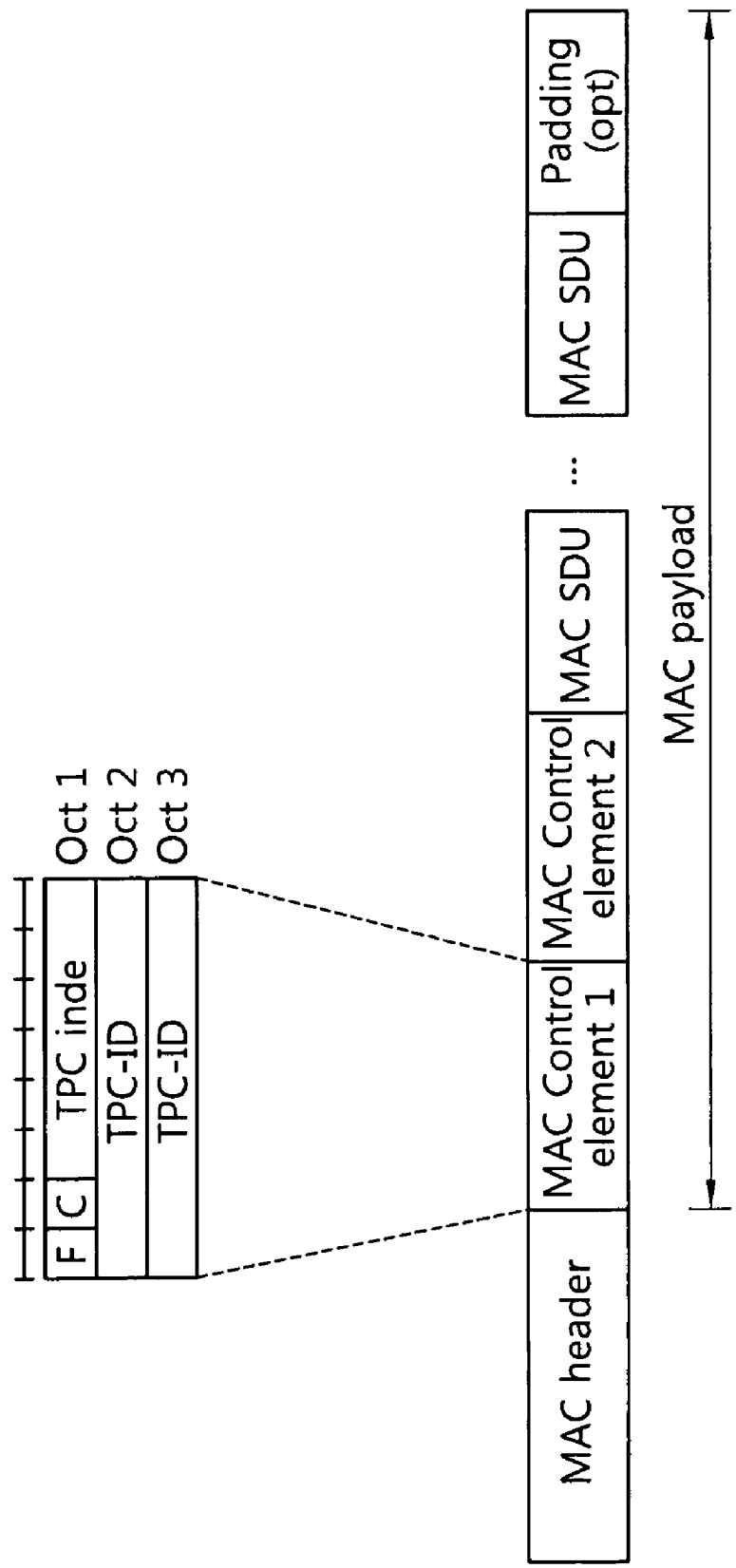
FIG. 16 shows a medium access control (MAC) protocol data unit (PDU) configured in a MAC layer.

FIG. 16 shows a MAC protocol data unit (PDU) configured in a MAC layer.

Referring to FIG. 16, the MAC PDU includes a MAC header, a MAC control element, and at least one MAC service data unit (SDU). The MAC header includes at least one subheader. Each subheader corresponds to the MAC control element and the MAC SDU. The subheader indicates a length and characteristic of the MAC control element or the MAC SDU. The MAC SDU is a data block delivered from an upper layer (e.g., RLC layer or RRC layer) of the MAC layer. The MAC control element is used to deliver control information of the MAC layer such as a buffer status report.

The information regarding the TPC-ID may be included in the MAC PDU in a format of the MAC control element. The MAC control element of the TPC-ID includes a format (F) field indicating a format of the TPC command, a channel (C) field indicating an uplink channel to which the TPC command is applied, a TPC index indicating the TPC command of a corresponding UE among a plurality of TPC commands, and the TPC-ID. The F field is 1-bit information indicating either the DCI format 3 or the DCI format 3A used by a corresponding PDCCH. The C field is 1-bit information indicating the PUSCH or the PUCCH.

The information regarding the TPC-ID may be configured in various formats, and there is no restriction on an order of each field or the number of bits of each field. Further, the MAC PDU may be configured by using only some of the fields. For example, if the UE knows its TPC-ID in advance, the TPC-ID may be excluded in transmission.

In a second embodiment, the BS can transmit the information regarding the TPC-ID to the UE by using an RRC message. The BS can report the information regarding the TPC-ID to the UE by using the RRC message when an RRC connection is set up or reconfigured.

In a third embodiment, the BS can transmit the information regarding the TPC-ID to the UE through the PDCCH. The BS can transmit the information regarding the TPC-ID in addition to uplink resource allocation information and/or downlink resource allocation information. For example, the information regarding the TPC-ID may be included in at least one of the DCI formats 0, 1, 1A, and 2.

In a fourth embodiment, the BS can transmit the information regarding the TPC-ID to the UE as a part of system information.

Figure 17:
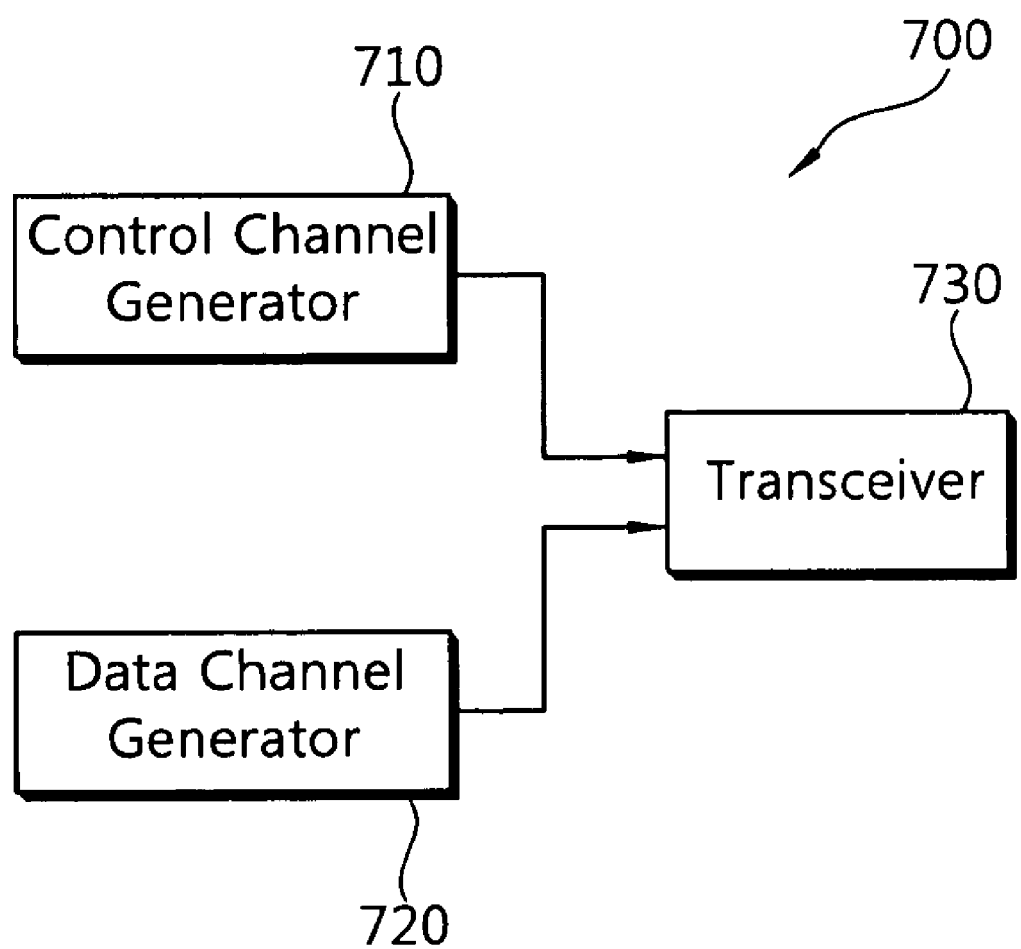
FIG. 17 is a block diagram showing an apparatus for wireless communication according to an embodiment of the present invention.

FIG. 17 is a block diagram showing an apparatus for wireless communication according to an embodiment of the present invention. An apparatus 700 may be a part of the BS. The apparatus 700 includes a control channel generator 710, a data channel generator 720, and a transceiver 730. The data channel generator 720 serves to process user data, and transmits the processed user data to the UE through the transceiver 730. The control channel generator 710 configures a control channel. The control channel generator 710 attaches CRC parity bits to DCI, and masks a TPC-ID on the CRC parity bits. The CRC-masked DCI is transmitted through the transceiver 730.

FIG. 18 is a flowchart showing a transmit power control method according to an embodiment of the present invention. This method can be performed by the UE. In step S810, the UE monitors a PDCCH. A CRC error checking may be detected by decoding the PDCCH. In step S820, the UE acquires a TPC command from the PDCCH where the CRC error is not detected. The PDCCH where the CRC error is not detected is regarded by the UE as DCI including the TPC command of the UE. When the DCI includes a plurality of TCP commands, the UE acquires its TPC command on the basis of a TPC index. In step S830, the UE adjusts a transmit power of an uplink channel according to the TPC command. If the TPC-ID used in the PDCCH detection is a first TPC-ID, the TPC command is used to control a transmit power of a first uplink channel (e.g., PUCCH). If the TPC-ID used in the PDCCH detection is a second TPC-ID, the TPC command is used to control a transmit power of a second uplink channel (e.g., PUSCH).

A transmit power of an uplink channel is adjusted using a transmit power control (TPC) command received on a downlink control channel. Therefore, interference with another user equipment may be mitigated and battery consumption of a user equipment can be reduced.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of controlling a transmit power of an uplink channel in a wireless communication system, the method performed by a user equipment (UE) comprising:

receiving, from a base station, downlink control information (DCI) on a physical downlink control channel (PD-CCH) by decoding at least one of a UE-specific search space and a common search space, wherein the received DCI is at least one of a first type DCI and a second type DCI different from the first type DCI, wherein the first type DCI includes a single TPC command, wherein the second type DCI includes a plurality of TPC commands, wherein cyclic redundancy check (CRC) parity bits associated with the second type DCI are masked with a radio network temporary identifier (RNTI) corresponding to a type of the uplink channel, wherein the uplink channel is indicated by the RNTI, wherein the second type DCI is included in the common search space; and when the first type DCI is received by the UE, adjusting the transmit power of the uplink channel based on the single TPC command, when the second type DCI is received by the UE, selecting one of the plurality of TPC commands according to index information received from the base station, and adjusting the transmit power of the uplink channel based on the selected TPC command.

2. The method of claim 1, wherein the uplink channel is at least one of a Physical Uplink Control Channel (PUCCH) and a Physical Uplink Shared Channel (PUSCH).

3. The method of claim 2, wherein the RNTI indicates whether the uplink channel is a PUCCH or a PUSCH.

4. The method of claim 1, wherein the RNTI is received from the base station.

5. The method of claim 1, wherein the size of the RNTI is 16 bits.

6. An apparatus controlling a transmit power of an uplink channel in a wireless communication system, the apparatus comprising:

a Radio Frequency (RF) unit configured for transmitting and receiving radio signals; and a processor coupled with the RF unit and configured for:

receiving, from a base station, downlink control information (DCI) on a physical downlink control channel (PD-CCH) by decoding at least one of a UE-specific search space and a common search space, wherein the received DCI is at least one of a first type DCI and a second type DCI different from the first type DCI, wherein the first type DCI includes a single TPC command, wherein the second type DCI includes a plurality of TPC commands, wherein cyclic redundancy check (CRC) parity bits associated with the second type DCI are masked with a radio network temporary identifier (RNTI) corresponding to a type of the uplink channel, wherein the uplink channel is indicated by the RNTI, wherein the second type DCI is included in the common search space; and when the first type DCI is received, adjusting the transmit power of the uplink channel based on the single TPC command, when the second type DCI is received, selecting one of the plurality of TPC commands according to index information received from the base station, and adjusting the transmit power of the uplink channel based on the selected TPC command.

7. The apparatus of claim 6, wherein the uplink channel is at least one of a Physical Uplink Control Channel (PUCCH) and a Physical Uplink Shared Channel (PUSCH).

8. The apparatus of claim 7, wherein the RNTI indicates whether the uplink channel is a PUCCH or a PUSCH.

9. The apparatus of claim 6, wherein the RNTI is received from the base station.

10. The apparatus of claim 6, wherein the size of the RNTI is 16 bits.

* * * * *